United States Patent
Wu et al.

(10) Patent No.: US 11,842,259 B1
(45) Date of Patent: Dec. 12, 2023

(54) INTELLIGENT INFORMATION PARSING METHOD BASED ON CROSS-MODAL DATA FUSION

(71) Applicant: University of Chinese Academy of Sciences, Beijing (CN)

(72) Inventors: Desheng Wu, Beijing (CN); Yunhao Xie, Beijing (CN); Yifan Zhang, Beijing (CN); Tianchi Zhao, Beijing (CN); Xiaolong Zheng, Beijing (CN)

(73) Assignee: University of Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/196,630

(22) Filed: May 12, 2023

(30) Foreign Application Priority Data

Jul. 12, 2022 (CN) .......................... 202210814535.7

(51) Int. Cl.
G06F 17/00 (2019.01)
G06N 3/02 (2006.01)
G06F 16/25 (2019.01)

(52) U.S. Cl.
CPC ............. *G06N 3/02* (2013.01); *G06F 16/254* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 5,918,222 A * | 6/1999 | Fukui | ..................... | G06Q 10/10 |
| 7,298,930 B1 * | 11/2007 | Erol | ....................... | G11B 27/28 |
| | | | | 707/999.001 |
| 10,217,120 B1 * | 2/2019 | Shin | .................... | G06Q 30/0201 |
| 11,023,709 B2 * | 6/2021 | Khitrov | ................ | G06V 40/169 |
| 11,354,683 B1 * | 6/2022 | Shin | .................... | G06Q 30/0201 |
| 2002/0135618 A1 * | 9/2002 | Maes | ..................... | G06V 40/165 |
| | | | | 715/767 |
| 2004/0093215 A1 | 5/2004 | Gupta et al. | | |
| 2007/0011609 A1 * | 1/2007 | Adjouadi | ................ | G06F 3/013 |
| | | | | 706/15 |
| 2008/0186477 A1 * | 8/2008 | Wang | .................... | G01N 21/253 |
| | | | | 356/73 |
| 2013/0015351 A1 * | 1/2013 | Kooijman | ............... | H01J 37/28 |
| | | | | 250/307 |

(Continued)

FOREIGN PATENT DOCUMENTS

| CN | 113627482 A | 11/2021 |
|---|---|---|
| CN | 113822224 A | 12/2021 |

(Continued)

OTHER PUBLICATIONS

Mou Zhijia, "Multimodal Learning Analytics: New Growth Points of Learning Analytics Studies," China Academic Journal, May 2020.

(Continued)

*Primary Examiner* — Hung D Le
(74) *Attorney, Agent, or Firm* — Pilloff Passino & Cosenza LLP; Sean A. Passino; Martin J. Cosenza

(57) ABSTRACT

Disclosed is an intelligent information parsing method based on cross-modal data fusion, including: step 1, acquiring information multi-modal data, step 2, processing the multi-modal data, step 3, fusing data features, step 4, establishing and training a parsing model, step 5, parsing fused cross-modal data, and step 6, viewing parsed data.

5 Claims, 3 Drawing Sheets

(56) References Cited

U.S. PATENT DOCUMENTS

| | | | | |
|---|---|---|---|---|
| 2013/0123600 A1* | 5/2013 | Tcheng | | A61B 5/316 607/45 |
| 2014/0149325 A1* | 5/2014 | Clifton | | G05B 23/024 706/12 |
| 2014/0188788 A1* | 7/2014 | Bridgen | | G06F 16/29 707/758 |
| 2015/0379094 A1* | 12/2015 | Ehlen | | G06F 40/40 707/722 |
| 2016/0071024 A1* | 3/2016 | Amer | | G06F 18/29 706/12 |
| 2017/0024389 A1* | 1/2017 | Liu | | G06F 16/9538 |
| 2018/0184964 A1* | 7/2018 | Simon | | A61B 5/162 |
| 2018/0189572 A1* | 7/2018 | Hori | | G06N 3/044 |
| 2019/0117106 A1* | 4/2019 | Simon | | A61B 5/377 |
| 2019/0147366 A1* | 5/2019 | Sankaran | | G06N 20/00 706/12 |
| 2019/0180737 A1* | 6/2019 | Abuelsaad | | G10L 25/90 |
| 2019/0325995 A1* | 10/2019 | Malone | | G16H 40/20 |
| 2021/0022641 A1* | 1/2021 | Siddharth | | A61B 5/725 |
| 2021/0150315 A1* | 5/2021 | Dang | | G06F 40/216 |
| 2021/0312920 A1* | 10/2021 | Stahl | | G10L 21/0316 |
| 2022/0327335 A1* | 10/2022 | Thopalli | | G06Q 10/06 |
| 2022/0405578 A1* | 12/2022 | Antonides | | G06F 18/214 |
| 2023/0008541 A1* | 1/2023 | Peled | | A61B 34/10 |
| 2023/0016037 A1* | 1/2023 | Murthy | | H05B 47/125 |
| 2023/0039196 A1* | 2/2023 | Lobo | | G06V 10/82 |
| 2023/0047714 A1* | 2/2023 | Baek | | G06F 18/251 |
| 2023/0074339 A1* | 3/2023 | Gharibi | | H04L 9/085 |
| 2023/0123430 A1* | 4/2023 | Dolan | | G06N 20/00 706/12 |
| 2023/0135293 A1* | 5/2023 | Chien | | G06F 40/279 704/9 |
| 2023/0177384 A1* | 6/2023 | Nagrani | | G06N 3/044 706/12 |

FOREIGN PATENT DOCUMENTS

| | | |
|---|---|---|
| CN | 114519809 A | 5/2022 |
| CN | 114595773 A | 6/2022 |
| CN | 115062328 B | 3/2023 |

OTHER PUBLICATIONS

Notice of Registration for China Application No. 202210814535.7, dated Jan. 16, 2023.

First Office Action for China Application No. 202210814535.7, dated Dec. 2, 2022.

* cited by examiner

US 11,842,259 B1

INTELLIGENT INFORMATION PARSING METHOD BASED ON CROSS-MODAL DATA FUSION

CROSS-REFERENCE TO RELATED APPLICATIONS

This application claims priority to Chinese Patent Application No. 202210814535.7, filed on Jul. 12, 2022, the entire contents of which are hereby incorporated by reference.

TECHNICAL FIELD

The application relates to the technical field of data fusion and parsing of smart cities, and in particular to an intelligent information parsing method based on cross-modal data fusion.

BACKGROUND

In a smart city, various information technologies or innovative concepts are used to integrate systems and services of the city, so as to improve an efficiency of resource utilization, optimize urban managements and services, and improve a quality of life of citizens. The smart city is an advanced form of urban informatization that fully utilizes a new generation of information technology in all walks of life in the city based on next-generation innovation in a knowledge-based society. The smart city achieves a deep integration of informatization, industrialization, and urbanization, thereby helping to alleviate a "big city problem", improve a quality of urbanization, achieve a refined and dynamic management, enhance an effectiveness of urban management, and improve the quality of life of citizens.

There are data from different ways in an information exchange of the same thing between different departments in one smart city. Data modes are different due to the different ways, resulting in certain differences in presentations of the data on the same thing, affecting judgments and cognition of people on things. Moreover, a lack of format conversion of different modal data also affects sharing of data flows between various departments. Therefore, an intelligent information parsing method based on cross-modal data fusion is provided according to the application to solve problems existing in the prior art.

SUMMARY

In view of the above problems, an objective of the application is to propose an intelligent information parsing method based on cross-modal data fusion. In the intelligent information parsing method based on the cross-modal data fusion, information exchange data of a same thing is unified by processing and fusing different modal data, facilitating cognition and judgments of people. Moreover, a need for format conversion also facilitates data exchanges on things between different departments, further accelerating a development of information and data exchange in smart cities.

In order to achieve the objective of the application, the application is realized by a following technical scheme: an intelligent information parsing method based on cross-modal data fusion, including following steps:

step 1, acquiring information multi-modal data, including establishing a data frequency conversion sampling model according to correlation features among various modal data collected historically, and collecting the multi-modal data by using the data frequency conversion sampling model based on Internet of Things and sensing equipment;

step 2, processing the multi-modal data, including preprocessing the collected multi-modal data, and then performing a single-modal internal parsing on preprocessed multi-modal data respectively; and extracting information data features and sorting according to correlation degrees, and obtaining information data feature sets;

step 3, fusing the data features, including normalizing different modal information data feature sets based on a data feature identification technology, establishing a cross-modal data fusion model based on a reverse tree structure, and fusing normalized data;

step 4, establishing and training a parsing model, including establishing a fusion data parsing model based on an artificial neural network, and performing an off-line training on the fusion data parsing model by using a historical database to obtain a trained parsing model;

step 5, parsing the fused cross-modal data, including importing the fused cross-modal data in the step 3 into the trained fusion data parsing model in the step 4 for parsing, and encrypting parsed data for outputting and transmitting; and step 6, viewing the parsed data, including decrypting encrypted data according to an authentication qualification of a query user, and then visually displaying the data after data conversions.

Optionally, the frequency conversion sampling model in the step 1 finds a comprehensive index for explaining all modal information data and without redundant information by using a principal component analysis model according to the correlation features among the various modal data, and determines a next collection time according to a change of the index, and a sampling frequency of the frequency conversion sampling model changes with the change of the comprehensive index.

Optionally, the sensing equipment includes a sensor, picture acquisition equipment and audio acquisition equipment.

Optionally, the preprocessing is to cut and delete the various modal data and data irrelevant to required data features, and only retain data features with the correlation degrees.

Optionally, a normalization in the step 3 is specifically carried out by a following formula:

$$\vec{z_1} = \frac{\vec{z_1} - \min(\vec{z_1})}{\max(\vec{z_1}) - \min(\vec{z_1})},$$

where $\vec{z_1}=[z_{i,t_1}, z_{i,t_2}, \ldots, z_{i,t_n}]$ represents a sampling value of data i acquired based on the Internet of Things and the sensing equipment from time $t_1$ to time $t_n$, and n represents a length of a sampling sequence.

Optionally, parsing by using the fusion data parsing model in the step 5 specifically includes:

step 501, defining and representing the fused cross-modal data;

step 502, extracting neural network rules from defined data based on a structural analysis method, and obtaining a rule set; and step 503, evaluating and sorting the rules extracted from the rule set according to four aspects of coverage, accuracy, contradiction and redundancy of the rules, and selecting a rule with an optimal order for parsing.

Optionally, an encryption method in the step 5 includes generating a random encryption key by using an encryption technology, and encrypting the parsed data by using the encryption key for transmitting; and the step 6 includes decrypting encrypted data by using the encryption key according to the authentication qualification of the query user, and finally obtaining required data.

Optionally, the data conversions in the step 6 include a data image conversion, a data table conversion and a data audio conversion.

The application has advantages as follows. According to the application, data of different modes are obtained by using the frequency conversion sampling model, ensuring that key information points may be collected and a description of things is closer to a description of a real perception;

a security of the data is improved by a secure transmission of the parsed data, and a leakage and a loss of important data are avoided; and information exchange data of a same thing is unified by processing and fusing different modal data, facilitating cognition and judgments of people. Moreover, it is convenient for different departments to exchange data without format conversion, thus further accelerating a development of information and data exchange in smart cities.

In order to more clearly explain embodiments of the application or technical scheme in the prior art, drawings needed to be used in a description of the embodiments or the prior art may be briefly introduced below. Obviously, the drawings in the following description are only some embodiments of the application, and other drawings can be obtained by ordinary people in the field without paying creative labor.

DETAILED DESCRIPTION OF THE EMBODIMENTS

Technical schemes in embodiments of the application may be clearly and completely described with reference to attached drawings in the following. Obviously, the described embodiments are only a part of the embodiments of the application, not all the embodiments. Based on the embodiments in the application, all other embodiments obtained by ordinary technicians in the field without creative efforts belong to a scope of protection of the application.

Embodiment 1

Figure 1:
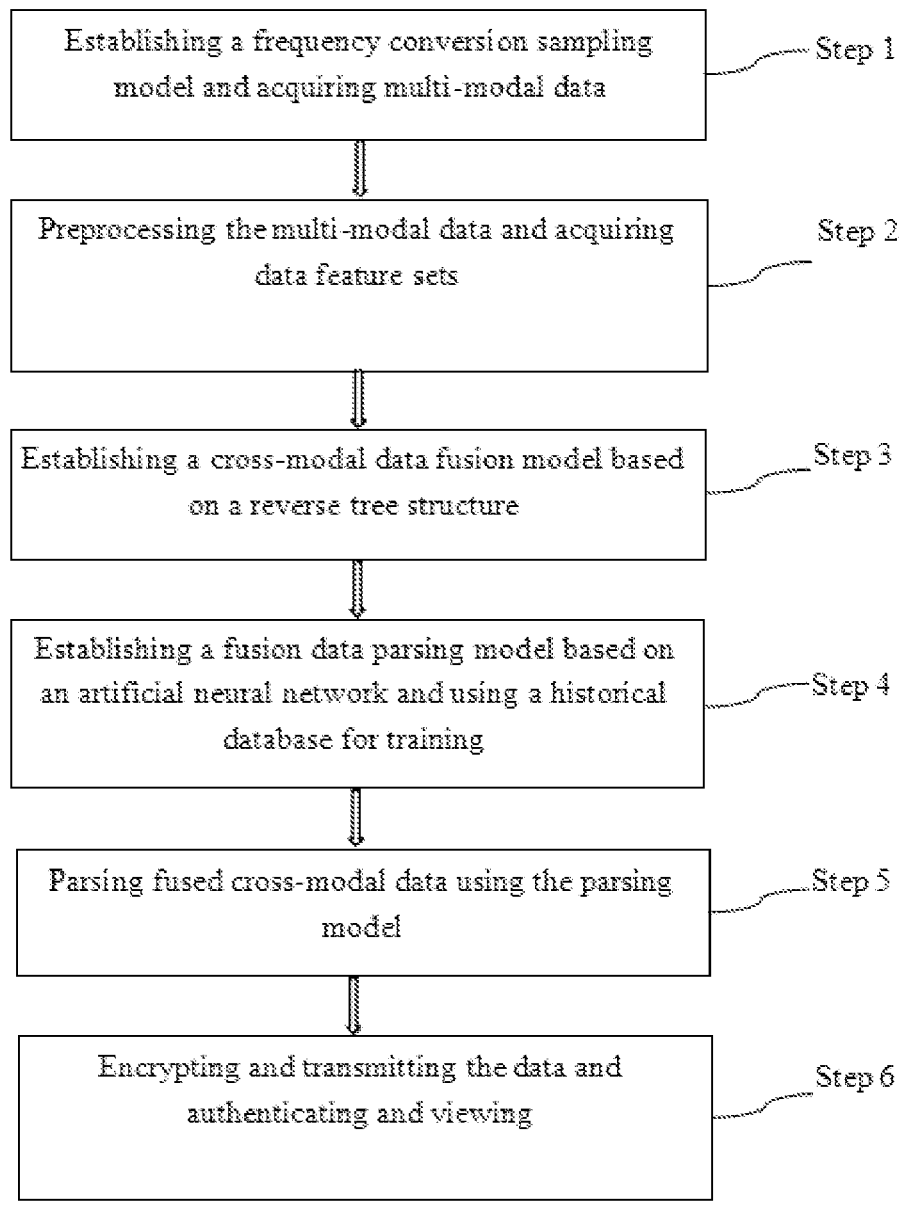
FIG. 1 is a flowchart of a method according to embodiment 1 of the application.
Figure 3:
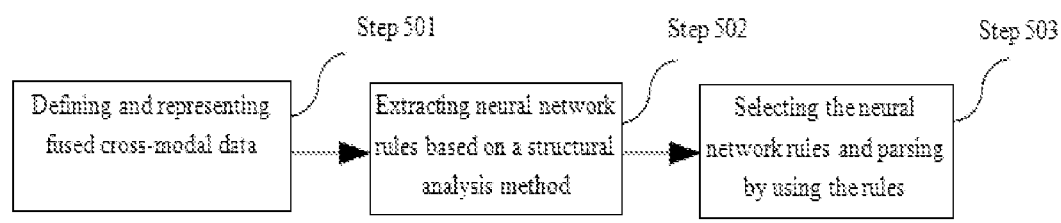
FIG. 3 is an analytical flow chart of a parsing model in a step 5 according to the application.

According to FIG. 1 and FIG. 3, this embodiment provides an intelligent information parsing method based on cross-modal data fusion, includes following steps:

step 1, acquiring information multi-modal data, including establishing a data frequency conversion sampling model according to correlation features among various modal data collected historically, and collecting the multi-modal data by using the data frequency conversion sampling model based on Internet of Things and sensing equipment, where the frequency conversion sampling model finds a comprehensive index for explaining all modal information data and without redundant information by using a principal component analysis model according to the correlation features among the various modal data, and determines a next collection time according to a change of the index, and a sampling frequency of the frequency conversion sampling model changes with the change of the comprehensive index; and the sensing equipment includes a sensor, picture acquisition equipment and audio acquisition equipment;

step 2, processing the multi-modal data, including pre-processing the collected multi-modal data, cutting and deleting the various modal data, data irrelevant to required data features, and data of interference factors, and only retaining data features with correlation degrees, and then performing a single-modal internal parsing on preprocessed multi-modal data respectively, extracting information data features and sorting according to the correlation degrees, and obtaining information data feature sets;

step 3, fusing the data features, including normalizing different modal information data feature sets based on a data feature identification technology, establishing a cross-modal data fusion model based on a reverse tree structure, and fusing normalized data, where a normalization is specifically carried out by a following formula:

$$\vec{z_1} = \frac{\vec{z_1} - \min(\vec{z_1})}{\max(\vec{z_1}) - \min(\vec{z_1})},$$

where $\vec{z_1}=[z_{i,t_1}, z_{i,t_2}, \ldots, z_{i,t_n}]$ represents a sampling value of data i acquired based on the Internet of Things and the sensing equipment from time $t_1$ to time $t_n$, and n represents a length of a sampling sequence;

step 4, establishing and training a parsing model, including establishing a fusion data parsing model based on an artificial neural network, and performing an off-line training on the fusion data parsing model by using a historical database to obtain a trained parsing model;

step 5, parsing fused cross-modal data, including importing the fused cross-modal data in the step 3 into the trained parsing model in the step 4 for parsing, and specifically:

step 501, defining and representing the fused cross-modal data;

step 502, extracting neural network rules from defined data based on a structural analysis method, and obtaining a rule set; and step 503, evaluating and sorting the rules extracted from the rule set according to four aspects of coverage, accuracy, contradiction and redundancy of the rules, and selecting a rule with an optimal order for parsing; and generating a random encryption key from parsed data by using an encryption technology, and encrypting the parsed data by using the key for transmitting; and step 6, viewing the parsed data, including decrypting encrypted data by using the encryption key according to an authentication qualification of a query user, and finally obtaining required data, and then performing a data image conversion, a data table conversion and a data audio conversion on the data, and then visually displaying the data.

Embodiment 2

Figure 2:
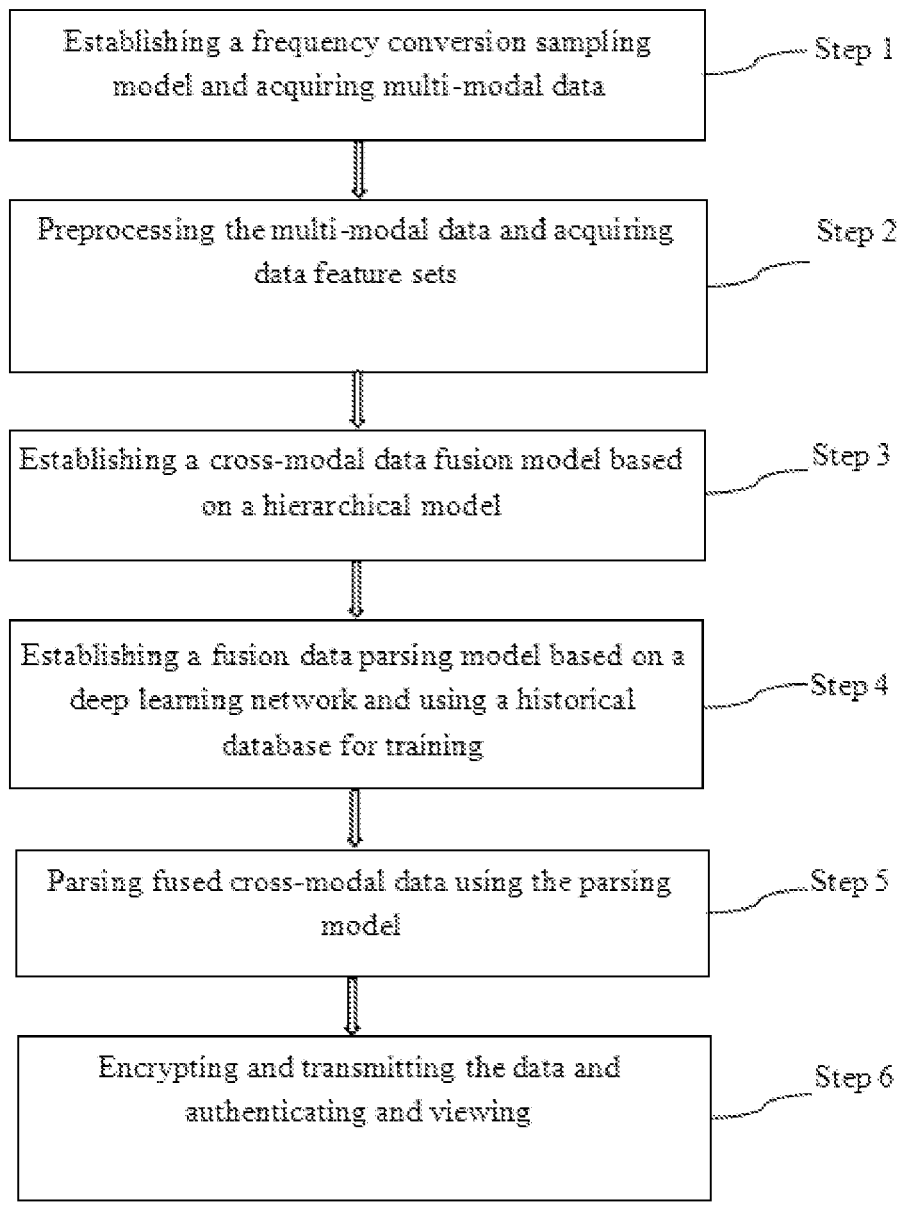
FIG. 2 is a flowchart of a method according to embodiment 2 of the application.

According to FIG. 2 and FIG. 3, this embodiment provides an intelligent information parsing method based on cross-modal data fusion, including following steps:

step 1, acquiring information multi-modal data, including establishing a data frequency conversion sampling model according to correlation features among various modal data collected historically, and collecting the multi-modal data by using the data frequency conversion sampling model based on Internet of Things and sensing equipment, where the frequency conversion sampling model finds a comprehensive index for explaining all modal information data and without redundant information by using a principal component analysis model according to the correlation features among the various modal data, and determines a next collection time according to a change of the index, and a sampling frequency of the frequency conversion sampling model changes with the change of the comprehensive index; and the sensing equipment includes a sensor, picture acquisition equipment and audio acquisition equipment;

step 2, processing the multi-modal data, including preprocessing the collected multi-modal data, cutting and deleting the various modal data and data irrelevant to required data features, and only retaining data features with correlation degrees, and then performing a single-modal internal parsing on preprocessed multi-modal data respectively, extracting information data features and sorting according to the correlation degrees, and obtaining information data feature sets;

step 3, fusing the data features, including normalizing different modal information data feature sets based on a data feature identification technology, establishing a cross-modal data fusion model based on a hierarchical model, and fusing normalized data, where a normalization is specifically carried out by a following formula:

$$\vec{z_1} = \frac{\vec{z_1} - \min(\vec{z_1})}{\max(\vec{z_1}) - \min(\vec{z_1})},$$

where $\vec{z_1}=[z_{i,t_1}, z_{i,t_2}, z_{i,t_n}]$ represents a sampling value of data i acquired based on the Internet of Things and the sensing equipment from time $t_1$ to time $t_n$, and n represents a length of a sampling sequence;

step 4, establishing and training a parsing model, including establishing a fusion data parsing model based on a deep learning network, and performing an off-line training on the fusion data parsing model by using a historical database to obtain a trained parsing model;

step 5, parsing fused cross-modal data, including importing the fused cross-modal data in the step 3 into the trained parsing model in the step 4 for parsing, and specifically:

step 501, defining and representing the fused cross-modal data;

step 502, extracting neural network rules from defined data based on a structural analysis method, and obtaining a rule set; and step 503, evaluating and sorting the rules extracted from the rule set according to four aspects of coverage, accuracy, contradiction and redundancy of the rules, and selecting a rule with an optimal order for parsing; and generating a random encryption key from parsed data by using an encryption technology, and encrypting the parsed data by using the key for transmitting; and step 6, viewing the parsed data, including decrypting encrypted data by using the encryption key according to an authentication qualification of a query user, and finally obtaining required data, and then performing a data image conversion, a data table conversion and a data audio conversion on the data, and then visually displaying the data.

According to the application, data of different modes are obtained by using the frequency conversion sampling model, ensuring that key information points may be collected and a description of things is closer to a description of a real perception. A security of the data is improved by a secure transmission of the parsed data, and a leakage and a loss of important data are avoided.

A basic principle, main features and advantages of the application have been shown and described above. It should be understood by those skilled in the art that the application is not limited by the above-mentioned embodiments, and what is described in the above-mentioned embodiments and descriptions only illustrates principles of the application. Without departing from a spirit and a scope of the application, there may be various changes and improvements in the application, and these changes and improvements fall within the scope of the claimed application. The scope of the application is defined by appended claims and their equivalents.

What is claimed is:

1. An intelligent information parsing method based on cross-modal data fusion, comprising:

step 1, acquiring information multi-modal data, comprising establishing a data frequency conversion sampling model according to correlation features among various modal data collected historically, and collecting the multi-modal data by using the data frequency conversion sampling model based on Internet of Things and sensing equipment, wherein the frequency conversion sampling model finds a comprehensive index for explaining all modal data and without redundant information by using a principal component analysis model according to the correlation features among the various modal data, and determines a next collection time according to a change of the comprehensive index, and a sampling frequency of the frequency conversion sampling model changes with the change of the comprehensive index;

step 2, processing the multi-modal data, comprising preprocessing the collected multi-modal data, and then performing a single-modal internal parsing on preprocessed multi-modal data respectively, wherein the preprocessing is to cut and delete the various modal data, data irrelevant to required data features, and data of interference factors, and only retain data features with correlation degrees; and extracting information data features and sorting according to the correlation degrees, and obtaining information data feature sets;

step 3, fusing the data features, comprising normalizing different modal-data feature sets based on a data feature identification technology, establishing a cross-modal data fusion model based on a reverse tree structure, and fusing normalized data; defining and representing fused cross-modal data; extracting neural network rules from defined data based on a structural analysis method, and obtaining a rule set; and evaluating and sorting the rules extracted from the rule set according to four aspects of coverage, accuracy, contradiction and redundancy of the rules, and selecting a rule with an optimal order for parsing;

step 4, establishing and training a fusion data parsing model, comprising establishing the fusion data parsing model based on an artificial neural network, and performing an off-line training on the fusion data parsing model by using a historical database to obtain a trained fusion data parsing model;

step 5, parsing the fused cross-modal data, comprising importing the fused cross-modal data in the step 3 into the trained fusion data parsing model in the step 4 for parsing, and encrypting parsed data for outputting and transmitting; and step 6, viewing the parsed data, comprising decrypting encrypted data according to an authentication qualification of a query user, and then visually displaying the data after data conversions.

2. The intelligent information parsing method based on the cross-modal data fusion according to claim 1, wherein: the sensing equipment in the step 1 comprises a sensor, picture acquisition equipment and audio acquisition equipment.

3. The intelligent information parsing method based on the cross-modal data fusion according to claim 1, wherein a normalization in the step 3 is specifically carried out by a following formula:

$$\vec{z_1} = \frac{\vec{z_1} - \min(\vec{z_1})}{\max(\vec{z_1}) - \min(\vec{z_1})},$$

wherein $\vec{z_1}=[z_{i,t_1}, z_{i,t_2}, z_{i,t_n}]$ represents a sampling value of data i acquired based on the Internet of Things and the sensing equipment from time $t_1$ to time $t_n$, and n represents a length of a sampling sequence.

4. The intelligent information parsing method based on the cross-modal data fusion according to claim 1, wherein:
an encryption method in the step 5 comprises generating a random encryption key by using an encryption technology, and encrypting the parsed data by using the encryption key for transmitting; and the step 6 comprises decrypting the encrypted data by using the encryption key according to the authentication qualification of the query user, and finally obtaining required data.

5. The intelligent information parsing method based on the cross-modal data fusion according to claim 1, wherein the data conversions in the step 6 comprise a data image conversion, a data table conversion and a data audio conversion.

* * * * *